United States Patent [19]

Bilek

[11] 4,216,511
[45] Aug. 5, 1980

[54] FLEXIBLE MAGNETIC RECORDING DISC WITH CARTRIDGE HAVING A LATCHING DRIVE MEMBER

[75] Inventor: Frank T. Bilek, Plano, Tex.

[73] Assignee: Texas Instruments Incorporated, Dallas, Tex.

[21] Appl. No.: 848,183

[22] Filed: Nov. 3, 1977

[51] Int. Cl.² .................. G11B 23/02; G11B 5/012
[52] U.S. Cl. ................................... 360/133; 360/99
[58] Field of Search .............................. 360/97–99, 360/133, 135, 86; 206/44 K

[56] References Cited

U.S. PATENT DOCUMENTS

| | | | |
|---|---|---|---|
| 3,475,741 | 10/1969 | Toney | 360/133 |
| 3,529,301 | 9/1970 | Hiruta | 360/97 |
| 3,947,893 | 3/1976 | Hall, Sr. | 360/133 |
| 4,057,840 | 11/1977 | Wingo | 360/133 X |

FOREIGN PATENT DOCUMENTS 2659574  7/1977  Fed. Rep. of Germany ........... 360/133

OTHER PUBLICATIONS

IBM Technical Disclosure Bulletin, vol. 19, No. 7 12-76, "Cartridge for Magnetic Disc" by King et al.
IBM Tech. Discl. Bulletin, vol. 19, No. 12, "Encased Flexible Magnetic Disc. Wiper" by Bolham.

*Primary Examiner*—John H. Wolff
*Attorney, Agent, or Firm*—Stephen S. Sadacca; Mel Sharp; William K. McCord

[57] ABSTRACT

A flexible disc is provided for the recording and playback of information on a recording surface thereof. The disc is contained within a cartridge housing which protects the recording surface. At least one opening is provided in the disc which is in permanent engagement with at least one pin member of a drive hub, the drive hub providing rotation to the disc when the drive hub is rotated. The outer perimeter of the opening in the disc is larger than the outer perimeter of the pin member so that the disc is free to move laterally along the pin. At least one surface of the cartridge housing acts as a smoothing plane; rotation of the disc causes the disc to rise above such surface creating an air cushion between the flexible disc and surface, with the disc seeking its own level above the smoothing plane surface. The hub, which is retained within the cartridge housing, is accessible through an opening in the housing for coupling the hub to a rotational means such as the drive shaft of a motor or other drive mechanism. The drive shaft includes an end member having a latch member in the form of a radial projection on the outer perimeter thereof. The hub member includes a latch member in the form of a radial projection on the inner perimeter thereof, the end member of the shaft being mateable with the hub member through the opening in the cartridge housing in such a manner that the latch members engage when the cartridge is in place and the shaft member is in rotation. Another opening is provided in the cartridge housing for receiving a recording and/or playback head; the head is moveable within such opening so that it may be selectively indexed to read and/or write information on a plurality of tracks as the disc rotates within the cartridge.

24 Claims, 8 Drawing Figures

FLEXIBLE MAGNETIC RECORDING DISC WITH CARTRIDGE HAVING A LATCHING DRIVE MEMBER

BACKGROUND OF THE INVENTION

This invention relates to flexible storage media cartridges and, more particularly, to such cartridges which contain a drive member in permanent engagement with the media for driving the media while permitting the media to be self-leveling within the cartridge housing.

This invention further relates to copending U.S. patent application Ser. Nos. 848,181, 848,182, and 848,184, filed of even date with and assigned to the assignee of the present invention. Copending application Ser. No. 848,181, now abandoned, describes a cartridge containing a flexible storage media. A cylindrical chamber is provided therein to retain the storage media and a cavity in the cylindrical wall of the chamber provides back pressure on the media to stabilize contact with a recording and/or playback head for recording or reading information onto the media. Copending Application Ser. No. 848,182 describes a recording system comprising a flexible information storage media which rotates above a smoothing plane surface. A flexible spring member biases the storage media against a recording and/or playback head for recording or reading information onto the media. Application Ser. No. 848,184, now abandoned, describes a cartridge containing a flexible information storage media which is coupled to a drive member by means of at least one pin member from the drive member extending through at least one opening in the storage media. The storage media is free to move laterally with respect to the drive member.

In recording or reading information on a moving information storage media, such as magnetic recording, relative motion between the record/read head and the recording media is required. The relative velocity between the head and media interface may be, for example, 550 IPS for video and high density digital applications. To achieve maximum performance, there must be an interface of intimate contact between the record/read head and the media surface without destruction or excessive wear of the magnetic flux responsive coating on the surface.

As contact pressure between the head and media is increased to improve performance, both media and head wear are increased. The problem is particularly severe in video applications, and compounded where the media is utilized for storing single video frames on separate tracks of a magnetic disc wherein one track at a time is continuously in contact with the head to provide a continuous stationary display of a single frame. In only five minutes of play time revolving at 3600 RPM, for example, a track on the disc is scraped about 18,000 times by the head. The wear products are so hard and abrasive that they are commonly used as lapping compounds.

To prevent failure causes by contact between the head and disc, lubricated surfaces and/or air film separations have been used. However, any separation between the head and disc caused by such lubricating fluid or air film imposes a loss of signal and, hence, performance. A head/disc separation equal to one wavelength could cause about a 54.6-dB loss in the output of the replay head. Since it is desired to record wavelengths that approach $70\mu''$, the playback head voltage is reduced to 50% by only $7.7\mu''$ of separation. On the otherhand, as discussed above, reduction of separation to meet desired performance would cause the interface to be destroyed within a few seconds.

Prior art solutions to the head-to-disc interface problem have generally been of two types: flying heads in conjunction with rigid hard plated discs, and heads having large surface areas buried in soft flexible "floppy" discs. Flying head discs are very expensive and require complicated and expensive recording/playback systems. The flexible or so-called "floppy" disc reduces the handling and cost problems realized in the flying head rigid-disc system. Some record/read heads for "floppy" discs are relatively large to provide an interface comprised of the large contoured head buried in the soft flexible media. The large record/read head surface area distributed the force per unit area to reduce media wear and separation loss. As the media is moved past the head, however, air collects between the head and disc surface to form an air film. The thickness of this air film is a function of media tension, head surface radius, viscosity of the air, and disc head relative velocity. Because of these restraints, most flexible or "floppy" disc applications are limited to slow speed, low bandwidth digital computer applications or voice recording systems. The performance penalty realized precluded the use of such flexible or disc interface for high-speed wide-bandwidth or video-type applications.

In U.S. Pat. No. 4,069,508, a system is described in which a flexible disc is rotated over a stationary smoothing plane surface by means of a drive member permanently connected to a rotational means. The drive member includes at least one pin member which mates with at least one opening in the storage media for coupling the information storage media thereto with the at least one opening having a larger perimeter than the at least one pin member to the extent that the information storage media is freely laterally moveable along the pin member wherein an air cushion of predetermined thickness is formed between the stationary surface and storage media when the media is in rotation. In such allowed patent application, several cartridge embodiments are described in which the drive member is permanently connected to the drive shaft of the rotational means, and is introduced into a centrally-located opening in the bottom smoothing plane surface of the cartridge for direct engagement with the disc or the entire smoothing plane surface is separate from the cartridge. Some problems which may be encountered with such cartridge include: difficulty encountered in mating the openings in the flexible storage media with the pins located on the drive member, and secondly, difficulty encountered is positioning a disc recorded on one recording apparatus for playback on a second recording apparatus in which the pins on the drive member or the openings in the disc are imprecisely located.

It is therefore an object of the present invention to provide an improved technique for storing information on a flexible storage media.

Another object of the invention is to provide an improved system for magnetically storing information on a flexible magnetic recording disc.

A still further object of the invention is to provide a flexible magnetic storage disc cartridge which permits a high-performance, narrow-track video record head to be used in contact with the magnetic disc.

It is another object of the invention to provide an apparatus which permits the precise recording and reproducing of wide bandwidth signals such as video signals using inexpensive flexible particulate-type recording media cartridges.

Another object of the invention is to provide a continuously replayable flexible magnetic storage media cartridge in which an air bearing of preselecting thickness between the replay head and media is maintainable regardless of head loading.

A further object of the invention is to provide a cartridge containing a recording media with a compliant, but resilient, magnetic recording surface capable of withstanding shock, vibration and head crashes without media degradation.

A still further object of the invention is to provide the stable record or playback of a flexible information storage media while it is in rotation in any plane, including upside-down.

It is another object of the invention to provide a cartridge for a flexible magnetic storage disc which is easily coupleable to a drive motor.

Yet a further object of the invention is to provide a flexible disc cartridge which may be accurately recorded and played back in different apparatus.

BRIEF SUMMARY OF THE INVENTION

These and other objects and advantages are provided in accordance with the present invention in which a system is provided for recording and/or reading information on a recording surface of a flexible information storage disc. The disc is contained within a cartridge housing which protects the recording surface of the disc. At least one opening is provided in the central portion of the disc which is in permanent engagement with at least one pin member of a drive hub member to provide the requisite rotation to the disc. The opening is larger than the pin member so that the disc is free to move laterally along the pin. At least one surface of the cartridge housing acts as a smoothing plane; rotation of the disc causes the disc to rise above such surface creating an air cushion between the flexible disc and surface with the disc seeking its own level above the surface. The hub, which is retained within the cartridge housing, is accessible through an opening in the housing for coupling the hub to a rotational means such as the drive shaft of a motor or other drive mechanism. The drive shaft includes an end member having a latch member in the form of a radial projection on the outer perimeter thereof. The hub member includes a latch member in the form of a radial projection on the inner perimeter thereof, the end member of the shaft being mateable with the hub member through the opening in the cartridge housing in such a manner that the latch members engage when the cartridge is in place and the shaft is in rotation. While in rotation, the hub member and end member of the shaft always engage identically in the same position which provides greater accuracy in the mounting of a cartridge in different recording and/or playback apparatus. Another opening is provided in the cartridge housing for receiving a recording and/or playback head; the head is moveable within such opening so that it may be selectively indexed to read and/or write information on a plurality of tracks as the disc rotates within the cartridge.

BRIEF DESCRIPTION OF THE DRAWINGS

Still further objects and advantages of the invention will become apparent from the detailed description and claims when read in conjunction with the accompanying drawings, wherein:

DETAILED DESCRIPTION OF PREFERRED EMBODIMENTS

Figure 1:
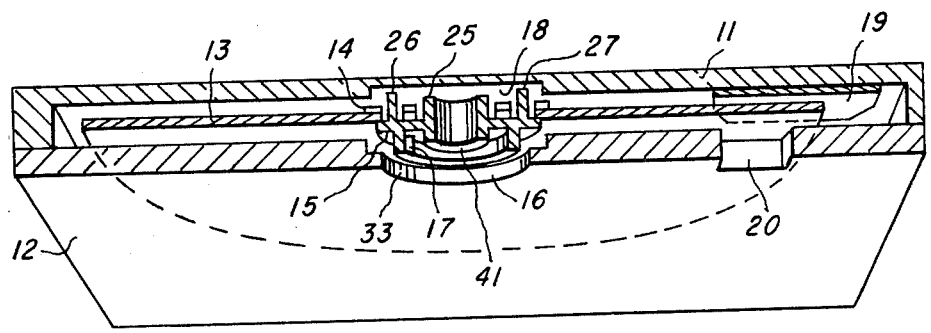
FIG. 1 is a cross-sectional view, in perspective, of a cartridge in accordance with the present invention.

Referring then to the drawings, a cartridge 10 containing a flexible information storage disc 13 is comprised of an upper housing member 11 and a lower housing member 12. In the present embodiment, upper housing member 11 is recessed to provide a cavity 34 in which the disc is contained, although the bottom member could alternately or additional be recessed, or an additional spacer member provided between the upper and lower members to provide the cavity.

In the present embodiment, two openings 22 and 23 are provided in central portion 14 of disc 13. The openings 22 and 23 are in permanent engagement with pin members 26 and 27 of drive hub member 15. An additional opening 24 is provided for the central member 25 of hub member 15. Hub member 15, which is permanently retained within the cartridge, normally rests in recess 40 of lower housing member 12. Hub member 15 is accessible by means of opening 33 provided in the lower housing member 12. In the present embodiment, a motor 28, illustrated in FIGS. 3a and 3b, having an end member 30, engages with hub member 15 through the opening 33 as will henceforth be described in detail.

Figure 2A:
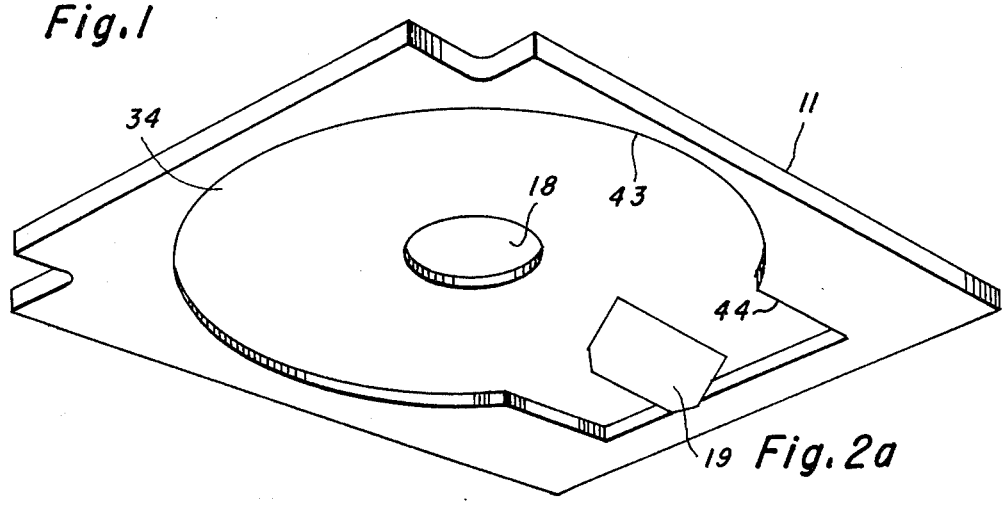
FIG. 2a is a perspective view of the upper member of the cartridge housing.

As illustrated in FIGS. 1 and 2a, upper housing member 11 has a first recessed portion 34 providing clearance for disc 13 and a further recess portion 18 providing clearance for drive member 15. Upper housing member 11 also includes a flexible spring member, in the present embodiment, comprised of mylar, which provides a bias against the rotating disc 13 opposite the recording/playback head which is received through opening 20 in the lower housing member 12. The bias provided by the mylar spring provides an improved interface between the recording surface of disc 13 and the recording/playback head.

Figure 2B:
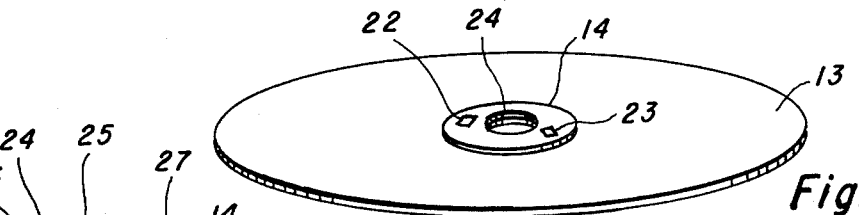
FIG. 2b is a perspective view of the flexible information storage disc.

As illustrated in FIG. 2b, disc 13 includes a reinforced central section 14 having two openings 22 and 23 for receiving drive pins 26 and 27 of hub member 15, and opening 24 for receiving central member 25 of hub member 15. Openings 22 and 23, in the present embodiment, are square and oriented at a 45° angle from each other; the side of one square and the two sides of the second square forming a corner provide three positive abutment edges for the drive pins according to the technique described and claimed in U.S. Pat. No. 4,060,839.

Figure 2C:
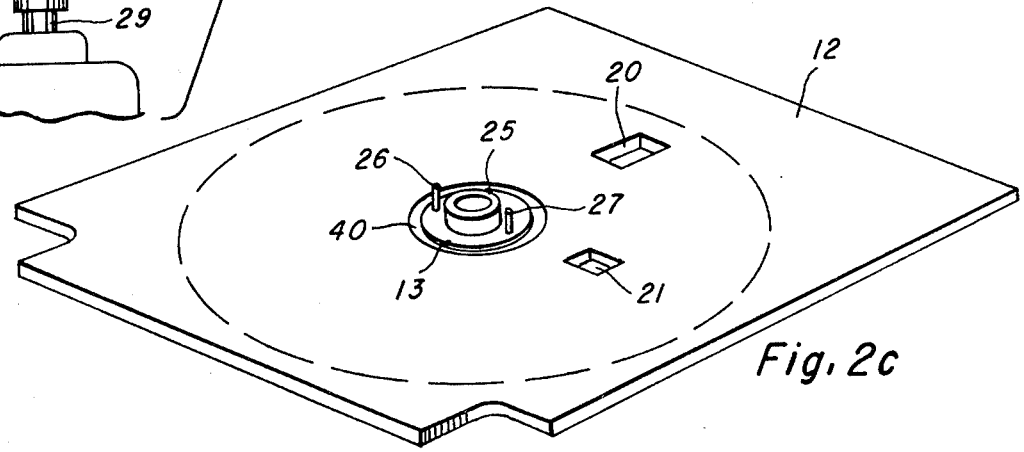
FIG. 2c is a perspective view of the lower member of the cartridge housing.

As illustrated in FIG. 2c, lower housing member 12 includes a recess 40 in which hub member 15 rests.

Lower housing member 12 also includes an opening 33 in recessed portion 40 which permits access of end member 30 of the drive shaft to the lower portion of hub member 15. An opening 20 is provided in lower housing member 12 for receiving a record and/or reading head; opening 20 is sufficiently large for the head to be moved to various indexed positions in the openings so that it can be selectively positioned with respect to different tracks on the recording surface of disc 13. A second opening 21 may also be provided for receiving a second recording and/or reading head which may be utilized for reading and/or writing a timing or a synchronization track on disc 13 for video applications.

Openings 22 and 23 in disc 13 are larger than pin members 26 and 27 of hub member 15, and opening 24 is larger than member 25 of hub member 15 so that the disc is free to move laterally along pin members 26 and 27 and member 25. With the upper surface of lower housing 12 acting as a smoothing plane, rotation of disc 13 causes the disc to rise above such surface creating an air cushion 41 between the disc and surface as shown in FIG. 3b.

Figure 3A:
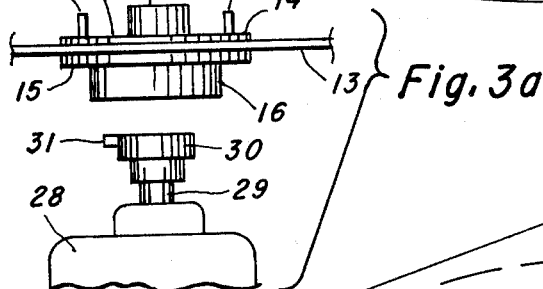
FIG. 3a is a detailed cross-sectional view of the disc in engagement with hub member.
Figure 3B:
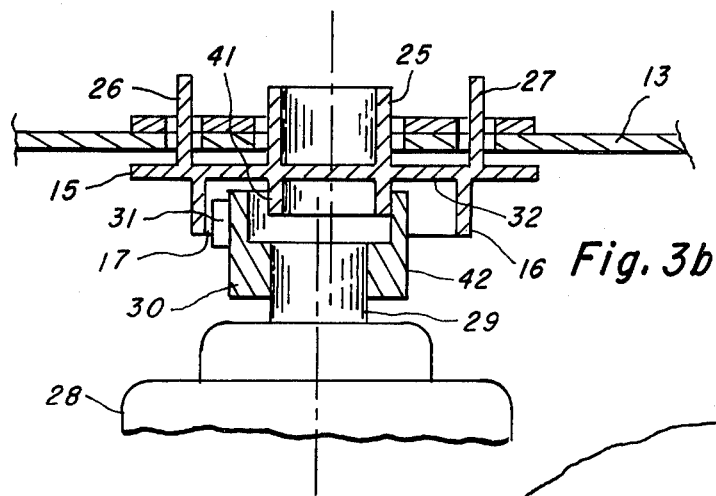
FIG. 3b is a detailed cross-sectional view of the disc in engagement with the hub member and with the end shaft member in engagement with the hub member.
Figure 4:
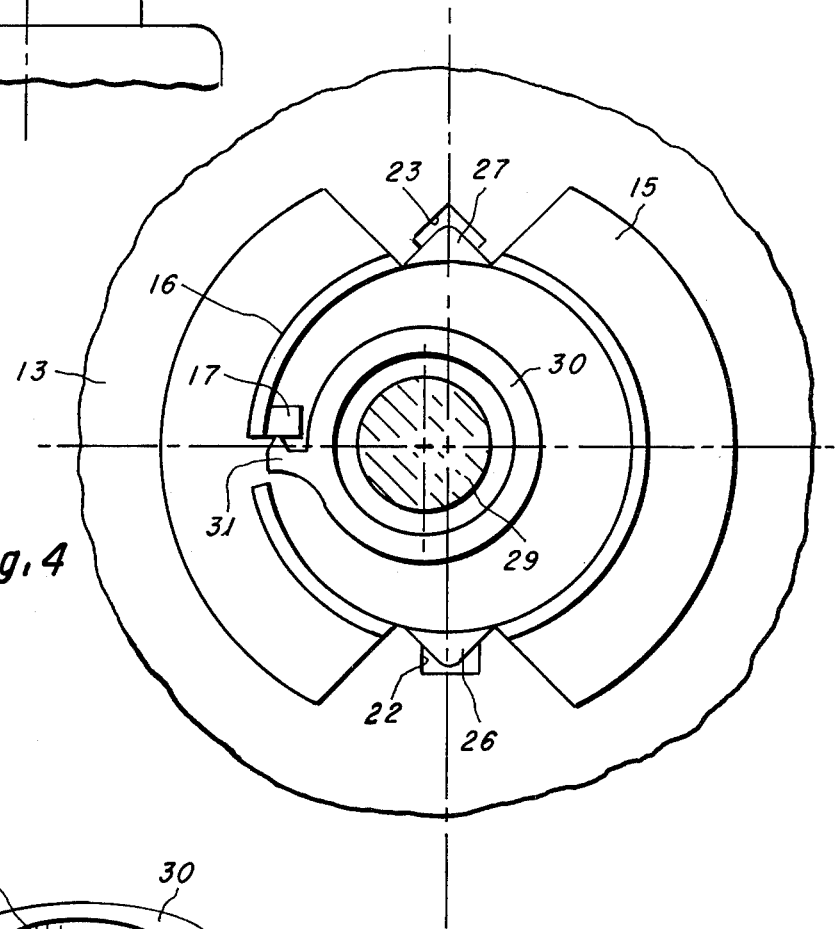
FIG. 4 is a bottom view of the hub member in engagement with the end member of the drive shaft.
Figure 5:
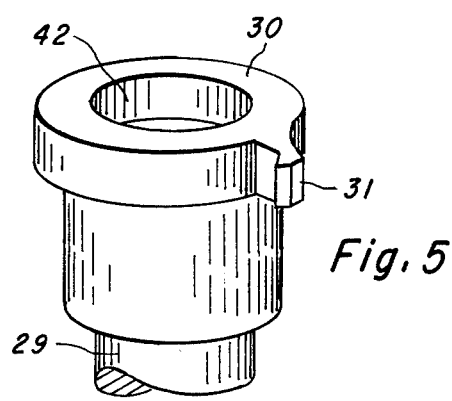
FIG. 5 is a perspective view of the end member of the drive shaft.

Referring to FIGS. 3a and 3b, the hub 15 and disc 13 are shown, out of and in engagement with, drive shaft 29 of drive motor 28, respectively. End member 30 coupled to drive shaft 29 fits loosely into the opening provided by cylindrical extension 16 of hub member 15. As motor 28 provides rotation to shaft 29 and, hence, to end member 30, latch member 31, in the form of a radial projection on the outer perimeter of end member 30, engages with latch member 17, in the form of a radial projection on the inner perimeter of cylindrical extension 16, as illustrated in FIGS. 3b and 4. Note that while in rotation, the outer perimeter of the cylindrical extension 41 of hub member 15 contacts the inner perimeter 42 of end member 30 along a line directly opposite the engaged latch members 17 and 31. Thus, hub member 15 and end member 30 always engage in the same identical position providing greater accuracy in positioning the recording tracks of the disc in the cartridge with respect to the recording and/or playback head of different recording and/or playback apparatus. The end member 30 is shown in detail in the perspective view of FIG. 5.

The cartridge as above described may be modified in other embodiments of the invention. For example, as described above, and as described and claimed in copending U.S. patent application, Ser. No. 848,182, filed of even date with and assigned to the assignee of the present invention, spring member 19 is utilized to apply a positive pressure on the back surface of disc 13. It has been discovered that a back pressure similar to that provided by spring member 19 is also created merely by including a cavity 44 in cylindrical wall 43 of recess 34 as illustrated in FIG. 3a, and by providing an essentially airtight seal between upper member 11 and lower member 12, as described and claimed in copending U.S. patent application, Ser. No. 848,181, as also filed of even date with and assigned to the assignee of the present invention.

In still a further embodiment of the invention, it is contemplated that instead of, or in addition to, having an opening in the central region of disc 13 and having one or more corresponding pins in drive hub member 15, if the drive hub member is sufficiently light in weight (comprised, for example, of teflon) the drive hub member may be permanently affixed to the central region of recording disc 13 such as by an adhesive material. In such instance, disc member 13 is still free to move laterally within chamber 34, to seek its own height above the smoothing plane surface of lower member 12. However, in this embodiment, the drive hub member also moves laterally along with the disc rather than the disc 13 moving relative to hub member 15 as well as the smoothing plane surface.

Various embodiments of cartridges with a flexible magnetic recording disc, according to the present invention, have now been described in detail. Since it is obvious that many additional changes and modifications can be made in the above-described details without departing from the nature and spirit of the invention, it is understood that the invention is not to be limited to said details except as set forth in the appended claims.

What is claimed is:

1. A system for recording and/or reading information on a recording surface of a sheet of flexible information storage media, said system comprising:
  (a) a sheet of flexible information storage media for storing information on a major surface thereof, said information storage media having a central opening and at least one off-center opening therein;
  (b) a drive member for providing rotational motion to said information storage media, said drive member having:
    (i) at least one pin member on one side thereof which is in permanent engagement with the respective at least one off-center opening in said information storage media, said at least one off-center opening having a larger perimeter than the perimeter of said at least one cooperating pin member so that said information storage media is free to move laterally along said pin member,
    (ii) a centrally located recess on the opposite side thereof, and
    (iii) a latch member in the form of a radial projection formed on a wall of said recess and extending inwardly therefrom; and
  (c) a cartridge housing in the form of a rigid envelope having a chamber containing said information storage media and said drive member, said cartridge housing having:
    (i) a first relatively flat surface with an opening for receiving a recording and/or playback head therethrough, said first relatively flat surface being in facing relationship to a first major surface of said information storage media, and
    (ii) a second relatively flat surface opposite said first relatively flat surface, said second relatively flat surface being in facing relationship to a second major surface of said information storage media; and
  (d) rotational means for engaging said drive member and providing rotational motion to said information storage media, said rotational means having a latch member extending radially outward to engage with the latch member of said drive member for rotating said information storage media.

2. The system according to claim 1, wherein said rotational means includes an end member having a latch member in the form of a radial projection on an outer surface thereof and wherein the recess in said drive member is larger than the end member of said rotational means such that said end member is insertable in said recess and the latch member of said end member is engageable with the latch member of said drive member for rotating said drive member by means of said rotational means.

3. The system according to claim 1, wherein said drive member further includes a projection centrally located in said recess for mating with a centrally located recess in an end of said end member, the outer perimeter of said projection always contacting the same points along the inner perimeter of the recess in said end member when said latch members are engaged, and said rotational means and drive member are in rotation.

4. The system according to claim 1, wherein said cartridge housing is comprised of a first relatively flat member and a second member having a recessed portion, said second member being mounted on said first member with said recessed portion adjacent said first member to provide said chamber.

5. The system according to claim 4, wherein said first opening is formed in said relatively flat member for providing access to said drive member.

6. The system according to claim 5, wherein a second recessed portion is provided in said first member adjacent to the recessed portion of said second member, said second recessed portion extending radially outward of said first opening for retaining said drive member in said second recessed portion.

7. The system according to claim 4, wherein said second opening is formed in said relatively flat member.

8. The system according to claim 4, wherein the surface of said relatively flat member, which is adjacent to said recessed portion, provides a smoothing plane for said sheet of flexible storage media.

9. The system according to claim 1 wherein at least 2 off-center openings are provided in the central region of said information storage media, a first off-center opening having at least one abutment edge and a second off-center opening having at least two abutment edges and wherein said drive member includes at least first and second pin members, said first and second pin members being permanently engaged with the first and second off-center openings in said information storage media, respectively, the three abutment edges providing accurate alignment of the media with respect to said drive member when the media is in rotation.

10. A cartridge comprising:
(a) a sheet of flexible magnetic recording media for storing information on a recording surface thereof, said sheet of recording media being in the shape of a disk, and having a central opening and at least one off-center opening;
(b) a drive member for providing rotational motion to said recording media, at least a portion of said drive member extending through said central opening, said drive member having:
  (i) at least one pin member on one side thereof which is in permament engagement with said at least one off-center opening in said recording media, said at least one off-center opening having a larger perimeter than the perimeter of said pin member so that said recording media is free to move laterally along said pin member,
  (ii) a centrally located recess on the opposite side thereof, and
  (iii) a latch member in the form of a radial projection formed on a wall of said recess and extending inwardly therefrom; and
(c) a cartridge housing in the form of a rigid envelope having a chamber, said recording media and said drive member being contained within said chamber wholly within said cartridge housing, said cartridge housing having:
  (i) a first opening providing access to said recess for engaging said drive member by means of said latch member, said first opening having a smaller perimeter than the perimeter of said drive member so that said drive member is permanently retained within said cartridge housing, and
  (ii) a second opening for receiving a magnetic recording and/or playback head for respectively writing and/or reading information on the recording surface of said recording media as said media is rotated within said cartridge housing.

11. The cartridge according to claim 10, wherein said cartridge housing is comprised of a first relatively flat member and a second member having a recess on one surface thereof, said second member being mounted on said first member with said recess adjacent to said first member for providing said chamber.

12. The cartridge according to claim 11, wherein said first opening is formed in said relatively flat member for providing access to said drive member.

13. The cartridge according to claim 12, wherein a second recess is provided in said first member adjacent to the recess of said second member, said second recess extending radially outward of said first opening for retaining said drive member in said second recess.

14. The cartridge according to claim 11, wherein said second opening is formed in said relatively flat member with said second opening exposing a portion of the recording surface of said recording media.

15. The cartridge according to claim 10, wherein the surface of said relatively flat member, which is adjacent to said recess portion, provides a smoothing plane for said sheet of flexible recording media, rotation of said recording media causing said recording media to rise above such surface, the free lateral movement of said recording media along the pin member of said drive member allowing said recording media to seek its own level above said surface.

16. The cartridge to claim 10 wherein at least two off-center openings are provided in a central region of said recording media, a first off-center opening having at least one embodiment edge, and a second off-center opening having at least two abutment edges and wherein said drive member includes at least first and second pin members, said first and second pin members being permanently engaged with the first and second off-center openings in said recording media, respectively, the three abutment edges providing accurate alignment of the media with respect to the drive member when the media is in rotation.

17. A cartridge comprising:
(a) a sheet of flexible information storage media for storing information on a major surface thereof;
(b) a drive member affixed to a central region of said media for providing rotational motion to said media when the drive member is rotated, said drive member having;
  (i) an extension portion in the form of a cylindrical wall extending from a major surface of said drive member, said cylindrical wall defining a centrally located recess within, and
  (ii) a single latch member in the form of a radial projecting formed on an inner surface of said cylindrical wall and extending therefrom into said recess; and (c) a cartridge housing in the form of a rigid envelope having an internal chamber, said information storage media and said drive member being contained within said chamber, said cartridge housing having:
  (i) a first opening providing access to said recess for engaging said drive member by means of said latch member to impart rotational motion to said drive member and said media, said first opening having a smaller perimeter than the perimeter of said drive member so that said drive member is retained within said cartridge housing, and
  (ii) a second opening for receiving a recording and/or playback head for respectively writing and/or reading information on said major surface of said media as said media is rotated within said cartridge housing.

18. The cartridge according to claim 17, wherein said cartridge housing is comprised of a first relatively flat member and a second member having a recessed portion, said second member being mounted on said first member with said recessed portion adjacent said first member to provide said chamber.

19. The cartridge according to claim 18, wherein said first opening is formed in said relatively flat member for providing access to said drive member.

20. The cartridge according to claim 19, wherein a second recessed portion is provided in said first member adjacent to the recessed portion of said second member, said second recessed portion extending radially outward of said first opening for retaining said drive member in said second recessed portion.

21. The cartridge according to claim 18, wherein said second opening is formed in said relatively flat member.

22. The cartridge according to claim 18, wherein the surface of said relatively flat member, which is adjacent to said recessed portion, provides a smoothing plane for said sheet of flexible storage media.

23. A system for recording and/or reading information on a recording surface of a sheet of flexible information storage media, said system comprising:
  (a) a sheet of flexible information storage media having a major surface for recording information thereon;
  (b) a drive member affixed to a central region of said information storage media for providing rotational motion to said media when said drive member is rotated, said drive member having:
    (i) an extension portion in the form of a cylindrical wall extending from a major surface of said drive member, said cylindrical wall defining a centrally located recess within, and
    (ii) a first single latch member in the form of a radial projection formed on an inner surface of said cylindrical wall and extending therefrom into said recess;
  (c) a cartridge housing in the form of a rigid envelope having a chamber, said information storage media and said drive member being contained within said chamber, said cartridge housing having:
    (i) a first opening providing access to said recess for engaging said drive member by means of said first latch member, said first opening having a smaller perimeter than the perimeter of said drive member so that said drive member is retained within said cartridge housing, and
    (ii) a second opening for receiving a recording and/or playback head for respectively writing and/or reading information on said major surface of said information storage media as said media is rotated within said cartridge housing; and
  (d) rotational means extending through said first opening of said cartridge housing for providing rotational motion to said information storage media, said rotational means having an end member with a second single latch member projecting radially outward from an outer surface thereof, said end member being insertable within said recess such that said first and second latch members are engageable to provide rotational motion to said information storage media.

24. The system according to claim 23, wherein said drive member further includes a projection centrally located in said recess for mating with a centrally located recess in an end of said end member, the outer perimeter of said projection always contacting the same points along the inner perimeter of the recess in said end member when said first and second latch members are engaged and said rotational means and drive means are in rotation.

* * * * *